United States Patent [19]

McCarty

[11] 4,293,847
[45] Oct. 6, 1981

[54] WATERPROOF SIGNAL LIGHT

[76] Inventor: Daniel A. McCarty, 3182 Old San Jose Rd., Soquel, Calif. 95073

[21] Appl. No.: 43,456

[22] Filed: May 29, 1979

[51] Int. Cl.³ .............................................. G08B 5/22
[52] U.S. Cl. ................................. 340/332; 116/28 R; 362/267; 340/84
[58] Field of Search .......... 116/28 R; 340/93, 366 E, 340/119, 87, 91, 102, 144, 332, 84; 362/61, 158, 362, 267; 264/272

[56] References Cited

U.S. PATENT DOCUMENTS

| | | | |
|---|---|---|---|
| 2,813,969 | 11/1957 | Schofield | 362/61 |
| 2,855,502 | 10/1958 | Johnson | 362/61 X |
| 2,890,445 | 6/1959 | Korry | 340/366 E X |
| 2,912,675 | 11/1959 | Habsburg-Lothringen et al. | 340/87 |
| 2,934,792 | 5/1960 | Harrington | 264/275 X |
| 3,046,388 | 7/1962 | Shinn | 362/267 |
| 3,080,581 | 3/1963 | Smihal | 362/61 X |
| 3,089,951 | 5/1963 | Baldwin | 362/267 |
| 3,323,117 | 5/1967 | Mason | 362/158 X |
| 3,419,859 | 12/1968 | Beall | 340/381 |
| 3,648,280 | 3/1972 | Jacobs | 340/388 X |
| 3,748,457 | 7/1973 | Balitzky et al. | 362/158 |
| 3,748,643 | 7/1973 | Jacobs | 340/122 X |
| 3,786,499 | 1/1974 | Janowski et al. | 340/366 E X |
| 3,887,093 | 6/1975 | Howell | 362/61 X |

*Primary Examiner*—Daniel M. Yasich
*Attorney, Agent, or Firm*—Paul B. Fihe

[57] ABSTRACT

A waterproof sealed signal light is mounted on a trailer frame. The signal light has two conductive leads with one of the conductive leads being a massive electrically conductive plate-like member which doubly serves as a mounting member. The mounted light is encompassed within an insulating resin-like material.

6 Claims, 2 Drawing Figures

WATERPROOF SIGNAL LIGHT

FIELD OF THE INVENTION

The present invention relates generally to lighting apparatus, and more particularly to a waterproof signal light which is particularly adapted for installation at positions which are subjected to water or moisture, so as to avoid any electrical shorts or other adverse effects.

BACKGROUND OF THE INVENTION

Brake lights, directional signals, and emergency lights are found on most automobiles; aircraft have flashing indicator or signal lights; and boats, in turn, have signal lights which indicate directional or emergency signals to others. In most cases the existing lights, consisting of a conventional electric bulb within an exterior partially protective housing, are most satisfactory, but under certain conditions, particularly where exposure to excessive moisture or water is encountered, such signal lights can indeed fail. As an obvious example, trailers for carrying boats require signal lights for signaling to following vehicles but are periodically exposed to an underwater condition when a boat carried thereby is to be launched, or alternatively is to be removed from the water, and consequent electrical failure constitutes a common experience.

SUMMARY OF THE PRESENT INVENTION

Accordingly, it is the general objective of the present invention to provide a signal light which is particularly designed to avoid failure resultant from exterior environmental conditions and, in particular, exposure to excessive moisture or water.

Generally, such objective is achieved by providing a waterproof signal light which utilizes a conventional light bulb having a filament that is enclosed by a transparent bulb of glass or similar material, and is connected to a base containing two terminals enabling exterior connection to a suitable voltage source. In accordance with the present invention, the two terminals of the standard bulb are connected to first and second conductive leads that are suitably joined thereto in electrical and heat-transmitting relationship for ultimate connection to the described voltage source. The bulb and the ends of the conductive leads are closely encompassed and, more particularly, are encapsulated within a suitable plastic, resin, or other suitable material which constitutes an insulator and also completely seals the bulb and the connections thereto from the exterior environment, thus providing a completely waterproof arrangement.

Specifically, the conventional light bulb includes a first exterior cylindrical terminal which is connected to ground by a first conductive lead and a central terminal in its base which is connected by a wire or other electrical lead to a positive side of a source of voltage. In the present instance, the first conductive lead mentioned hereinabove takes the form of a relatively rigid massive member composed of electrically conductive and also heat conductive material that is connected to the cylinder at its one extremity and serves as a mounting bracket at its opposite extremity outside of the encapsulating material to a grounded metallic structure such as the frame of a boat trailer, thus providing at one and the same time a connection to complete the electrical circuit, a heat-conductive mechanism, and a mounting structure. The other conductive lead is connected simply to a positive source of voltage, thus enabling completion of the circuit and energization of the filament within the bulb.

Preferably the encapsulating material is formed by a translucent plastic so that light can be directed from the light bulb in all directions, and a reflective backing can be applied to one portion thereof to provide a directional emanation of the light from the unit.

BRIEF DESCRIPTION OF THE DRAWING

The stated objective of the invention and the manner in which it is achieved as summarized hereinabove will be more readily understood by reference to the following detailed description of the structure shown in the accompanying drawing wherein.

DETAILED DESCRIPTION OF THE EXEMPLARY EMBODIMENT OF THE INVENTION

Figure 1:
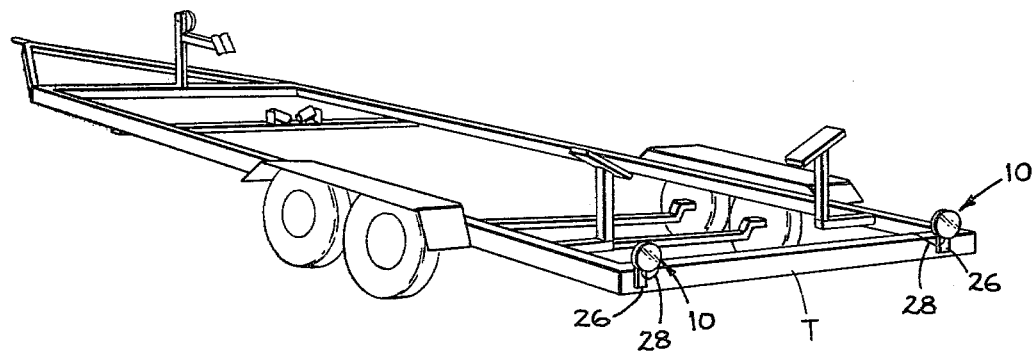
FIG. 1 is a perspective view of a pair of signal lights embodying the present invention attached to the rear of a boat trailer.

With initial reference to FIG. 1, a pair of signal lights 10 embodying the present invention are mounted in a manner to be described in detail hereinafter at the left rear and right rear of a boat trailer T at a position such that, as will be obvious from viewing FIG. 1, they will be inundated at the time that a boat is to be launched or removed from the water.

Figure 2:
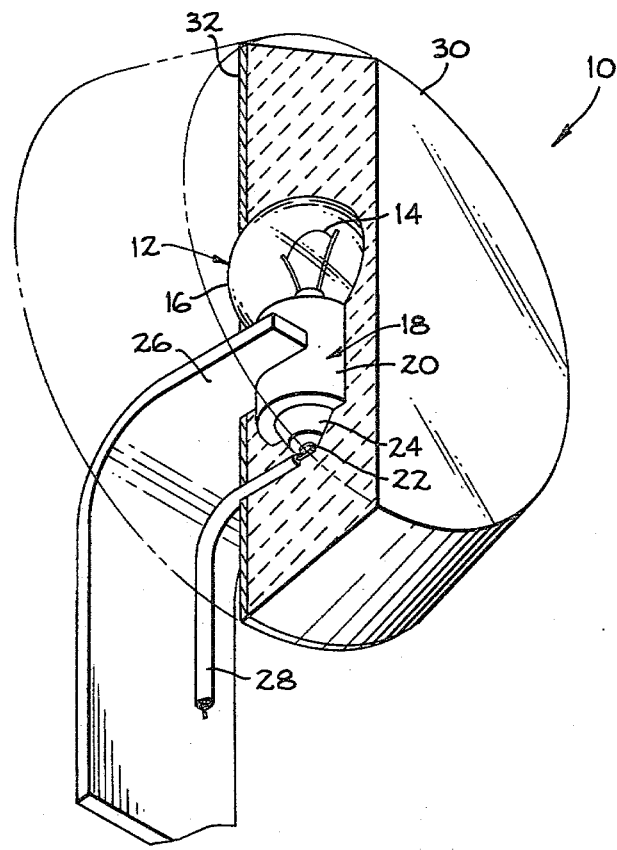
FIG. 2 is a greatly enlarged perspective view of one of the signal lights shown in FIG. 1, with portions thereof broken away to show interior details of its construction.

With additional reference to FIG. 2, each signal light 10 includes an electric light bulb 12 of substantially standard configuration, including a filament 14 which is encompassed by a glass or other transparent envelope 16 and is joined to a base 18 which includes an exterior generally cylindrical conductive member 20 which is connected to one end of the filament and thus forms one terminal of the bulb. The other extremity of the filament 14 is connected to a central conductive member 22 in the base 18 which is separated from the cylindrical terminal 20 by a suitable insulator 24 so as to provide a second central terminal at the bottom of the base.

In accordance with the present invention, a first conductive lead 26 in the form of a flat plate of aluminum or other electrically-conductive and heat-conductive material is arranged for contact with the exterior cylindrical terminal 20, such plate being notched at its one extremity to closely encompass the exterior terminal over a rather extensive area and preferably, as best shown in FIG. 2, being bent at its opposite extremity to enable metallic connection to a strut on the trailer T or any other conductive member which also will function as a heat sink for any heat distributed when the bulb is energized. The connection can be by welding or by screws, or any other conventional mechanism. The other central bottom terminal is connected by an insulated wire 28 or other conductor which extends for any desired distance to a suitable source of voltage (not shown), thus enabling energization of the light bulb.

The entire bulb 12 and the two connections of the conductive leads 26,28 thereto are completely encapsulated within an insulating material 30 such as an epoxy resin which is translucent and also is substantially rigid after the casting procedure so as to support the members and completely enclose the same against the exterior environment so there is no possibility of a short across the bulb terminals or between the connecting wires at their connections to the bulb terminals. The more massive first conductive lead 26 is thus rigidly held in its position in contact with the one terminal 20 of the bulb and at its exposed extremity with the supporting member of the trailer, thus providing a rigid support for the entire structure, which also provides for the distribution of heat from the bulb when the latter is energized, in spite of the fact that the bulb itself is completely encapsulated and is not directly exposed to the exterior environment for cooling purposes.

The plastic resin 30 can be clear or colored as required, and preferably is coated on one surface as indicated in FIG. 2 with a reflective backing 32 also of insulating material, to provide a directional dispersion of the light from the bulb.

As will be obvious, the entire structure is exceedingly simple, can be cheaply manufactured, and when the bulb filament has burned out, can be readily replaced without difficulty and without excessive cost. It will also be apparent that many modifications and/or alterations in this structure as described can be made without departing from the general spirit of the present invention and the foregoing description of one embodiment is accordingly to be considered as purely exemplary and not in a limiting sense, and the actual scope of the invention is to be indicated only by reference to the appended claims.

What is claimed is:

1. A waterproof signal light which comprises
   an electric light bulb having a filament enclosed by a transparent member and connected at its opposite extremities to two terminals in a base supporting said transparent member,
   first and second conductive leads connected to and extending from said terminals, and
   means completely and sealingly encapsulating said bulb and portions of said leads where connected to said bulb;
   said first conductive lead being formed by relatively massive and heat conductive material in the form of a rigid bracket adapted to mount the entire unit from an exterior support.

2. A waterproof signal light according to claim 1 wherein
   one of said light bulb terminals constitutes a cylindrical conductor and
   said first conductive lead is connected to said cylindrical conductor over an extensive area to provide an effective and substantial current and heat transfer therebetween.

3. A waterproof signal light according to claim 1 wherein
   said encapsulating means constitutes relatively rigid material encompassing a substantial part of said first conductive lead to provide a fixed support therefor.

4. A waterproof signal light according to claim 1 wherein
   said encapsulating means is formed by translucent material.

5. A waterproof signal light according to claim 4 which comprises
   a reflective backing on one portion of said translucent encapsulating means.

6. A waterproof signal light according to claim 1 which comprises
   a rigid grounded electric member mounting said first conductive lead so as to electrically ground, physically support, and provide heat transfer from said bulb and first conductive lead.

* * * * *